March 9, 1926.  1,576,129
H. S. BANHOLZER ET AL.
DIRIGIBLE HEADLIGHT
Filed July 7, 1925
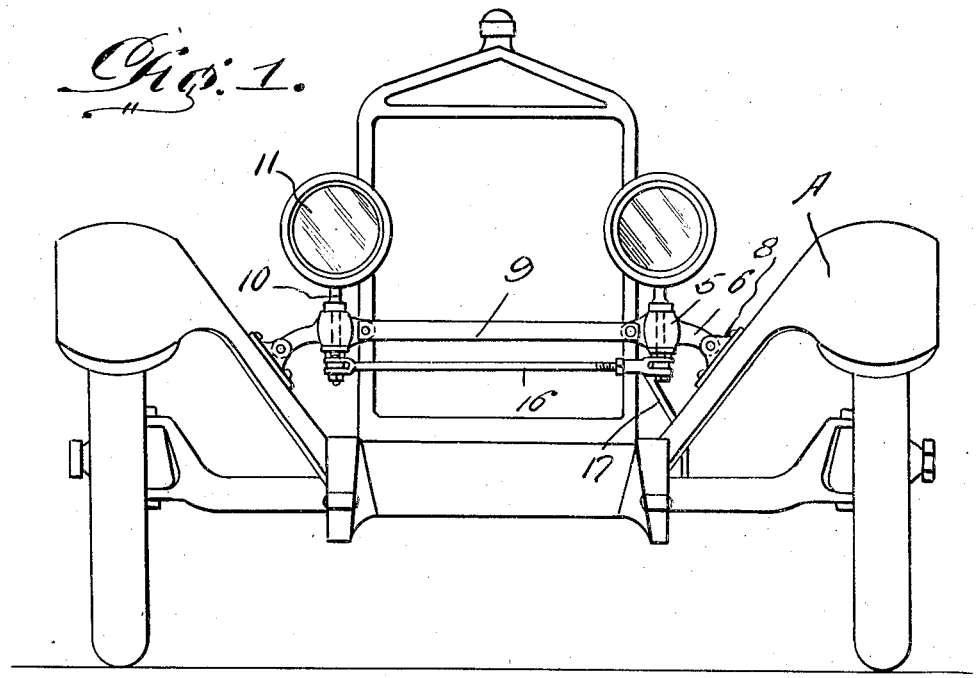
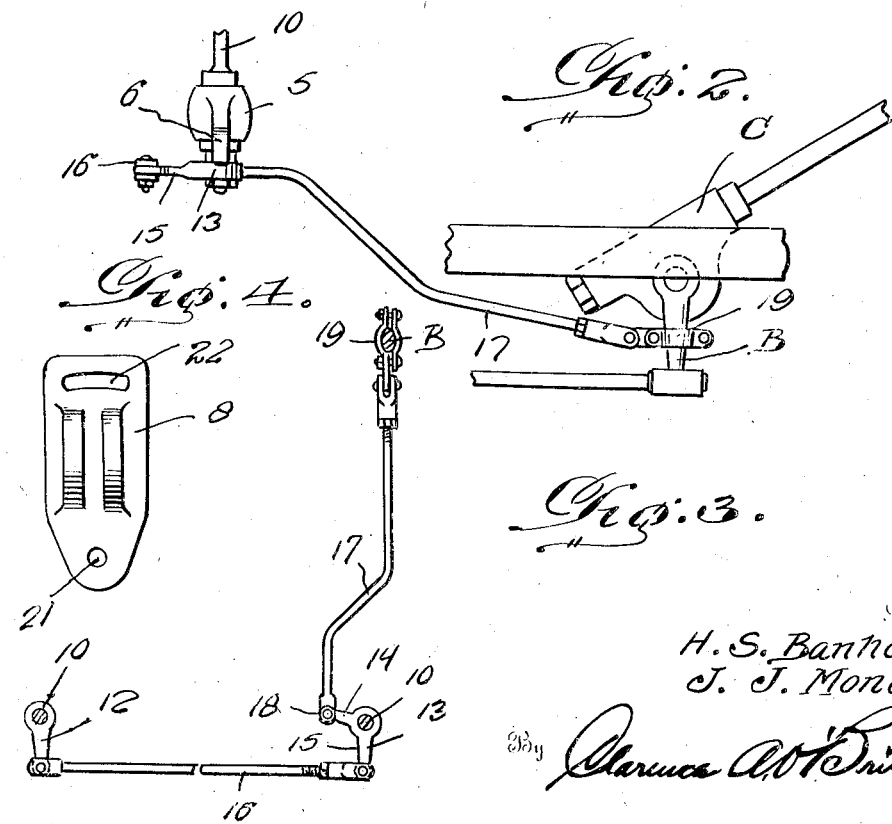
Inventors
H. S. Banholzer,
J. J. Montague,
By Clarence A. O'Brien
Attorney Patented Mar. 9, 1926.

1,576,129

UNITED STATES PATENT OFFICE.

HERWIN S. BANHOLZER AND JOHN J. MONTAGUE, OF BICKNELL, INDIANA.

DIRIGIBLE HEADLIGHT.

Application filed July 7, 1925. Serial No. 41,985.

*To all whom it may concern:*

Be it known that we, HERWIN S. BANHOLZER and JOHN J. MONTAGUE, citizens of the United States, residing at Bicknell, in the county of Knox and State of Indiana, have invented certain new and useful Improvements in a Dirigible Headlight, of which the following is a specification.

The present invention appertains to a dirigible headlight for automobiles and other vehicles, the invention residing in the construction, combination and arrangement of parts as claimed, whereby the headlights are simultaneously shifted either to the right or the left incident to the steering of the vehicle, thus maintaining the light rays always in the course pursued by the vehicle to properly illuminate the roadway.

Some of the important objects of the invention are to provide a device of this nature which is exceedingly simple in its construction, may be manufactured at a low cost, is adjustable to vary the lead or lag of the device in relation to the steering mechanism, is easy to assemble or disassemble, is reliable and efficient in operation, is not likely to easily become out of order, and is otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing—

Figure 1 is a front elevation of an automobile showing our improved dirigible headlight mechanism associated therewith, Fig. 2 is a fragmentary detail side elevation thereof, Fig. 3 is a plan view of portions thereof, and Fig. 4 is an elevation of one of the brackets adapted to be attached to an apron of the fender.

Referring to the drawing in detail, it will be seen that the automobile includes among other known elements a pair of fenders A and a steering arm B actuated in the usual well known manner by the steering mechanism C. Referring now particularly to our improvement, it will be seen that numerals 5 designate two journal brackets having arms 6 extending therefrom and engaged with members 8 fixed to the inner sides of the fenders A. A brace bar 9 is disposed between the two journal brackets 5. Shafts 10 depend from headlights 11 and are journaled in the brackets 5. A crank 12 is fixed or formed on the lower end of one shaft 10 and a bell crank 13 is fixed or formed on the lower end of the other shaft 10. The bell crank 13 is provided with arms 14 and 15. An adjustable rod 16 connects the ends of the crank 12 and the arm 15 of the bell crank 13. A rod 17 is pivoted to the end of the arm 14 as is indicated at 18 and is pivotally engaged with an adjustable clamp 19 which is engaged with the arm B. By proper adjustment of this clamp 19 on the arm B, it will be seen that the length of the throw of the cranks 12 and 13 may be adjusted.

From the above detailed description it will be seen that when the steering apparatus C is operated for turning the front wheels of the vehicle, the rod 17 will be actuated to swing the crank 13 which in turn will swing the crank 12 through the intermediacy of the connecting rod 16, and the turning of these cranks 12 and 13 will cause the swinging of the headlights 11 to be dirigible with the wheels of the vehicle which are steered by the apparatus C.

By the proper adjustment of the clamp 19 the throw of the headlights may be adjusted so as to lead or lag in relation to the dirigible wheels of the vehicle. The construction, operation, and advantages of this invention should now be clearly understood by those skilled in this art without a more detailed description thereof. It is to be pointed out, however, that the present embodiment of the invention has been disclosed merely by way of example since in practice it attains the various features of advantage enumerated as desirable in the statement of the invention and the above description, but it is apparent that numerous changes in the details of construction, and in the combination and arrangement of parts may be resorted to without departing from the spirit or scope of the invention as hereinafter claimed, or sacrificing any of its advantages.

By referring particularly to Fig. 4, it will be seen that each bracket 8 has an aperture 21 at its bottom end and an arcuate slot 22 at its upper end. The slot 22 is arranged concentrically in relation to the apertures 21 and as a center. With these brackets 8, constructed as just described, it will be seen that the headlights may be tilted to the desired angles by loosening the fastening element adapted to pierce the slot 22 and rotating the brackets 8 and then again tightening the fastening elements.

Having thus described our invention, what we claim as new is:—

In a vehicle wherein the same includes a pair of fenders, a pair of arms, journal brackets formed on the arms, means connecting the arms, shafts journaled in the journal brackets, headlights on the upper ends of the shafts, a steering mechanism, and means connecting the steering mechanism with the shafts, a pair of plates having their lower ends pivoted to the fenders and their upper ends provided with arcuate slots, bolts extending from the fenders through the slots to hold the said plates in adjusted positions on the fenders, and a pair of straight parallel ears projecting from said plates to which said arms are pivoted.

In testimony whereof we affix our signatures.

HERWIN S. BANHOLZER.
JOHN J. MONTAGUE.